US009281777B1

(12) United States Patent
Borgstrom

(10) Patent No.: US 9,281,777 B1
(45) Date of Patent: Mar. 8, 2016

(54) SOLAR PANEL SUPPORT APPARATUS

(71) Applicant: Charles B. Borgstrom, New Richmond, WI (US)

(72) Inventor: Charles B. Borgstrom, New Richmond, WI (US)

(*) Notice: Subject to any disclaimer, the term of this patent is extended or adjusted under 35 U.S.C. 154(b) by 450 days.

(21) Appl. No.: 13/678,490

(22) Filed: Nov. 15, 2012

Related U.S. Application Data

(60) Provisional application No. 61/560,738, filed on Nov. 16, 2011.

(51) Int. Cl.
*H01L 31/042* (2014.01)
*B21D 53/02* (2006.01)
*F24J 2/52* (2006.01)
*F16M 11/38* (2006.01)
*F24J 2/54* (2006.01)

(52) U.S. Cl.
CPC ............ *H02S 20/00* (2013.01); *B21D 53/02* (2013.01); *F16M 11/38* (2013.01); *F24J 2/523* (2013.01); *F24J 2/5264* (2013.01); *F24J 2/5431* (2013.01); *F16M 2200/00* (2013.01); *F24J 2002/5283* (2013.01); *F24J 2002/5288* (2013.01); *Y10T 29/49355* (2015.01)

(58) Field of Classification Search
CPC ............ F24J 2/38; F24J 2/54; F24J 2/5403; F24J 2/541; F24J 2/523; F24J 2/5264; F24J 2002/5288; F24J 2002/529; F24J 2002/5277; F24J 2002/5283; F16M 2200/06; F16M 2200/063; F16M 2200/00; F16M 11/32; F16M 11/34; F16M 11/38; Y10T 29/49355; B21D 53/02; H02S 20/00
See application file for complete search history.

(56) References Cited

U.S. PATENT DOCUMENTS

| 4,172,739 | A | | 10/1979 | Tassen | |
|---|---|---|---|---|---|
| 4,245,153 | A | * | 1/1981 | Porter | F24J 2/38 250/203.4 |
| 4,300,537 | A | | 11/1981 | Davis | |
| 4,930,493 | A | * | 6/1990 | Sallis | F24J 2/5431 126/600 |
| 6,575,656 | B2 | * | 6/2003 | Suh | 403/109.6 |
| 6,960,717 | B2 | | 11/2005 | Stuart et al. | |
| 7,360,549 | B2 | * | 4/2008 | Seo | 135/145 |
| 7,476,832 | B2 | * | 1/2009 | Vendig | F24J 2/405 250/203.1 |
| 7,703,246 | B2 | | 4/2010 | Chang | |
| 7,730,676 | B2 | | 6/2010 | Hon | |
| 8,119,963 | B2 | | 2/2012 | Scanlon | |
| 8,895,836 | B2 | * | 11/2014 | Amin et al. | 136/246 |
| 2007/0215199 | A1 | * | 9/2007 | Dold | F24J 2/5424 136/246 |
| 2007/0246039 | A1 | | 10/2007 | Brazier et al. | |
| 2008/0308091 | A1 | | 12/2008 | Corio | |
| 2009/0014054 | A1 | | 1/2009 | Cano Messeguer et al. | |
| 2009/0050191 | A1 | * | 2/2009 | Young | F24J 2/38 136/246 |
| 2009/0114211 | A1 | | 5/2009 | Homyk et al. | |

(Continued)

*Primary Examiner* — Sarang Afzali
(74) *Attorney, Agent, or Firm* — DuFault Law Firm, P.C.; Dustin R. DuFault

(57) ABSTRACT

A solar panel support apparatus for selectively positioning a solar panel contained thereon comprises forward and rearward legs securable to the ground or an affixed structure. One or more solar panels is supported by a rack having an end pivotally attachable to the forward leg. First and second arms pivotally connected to one another pivotally attach to the forward leg and the rack permitting the rack to be positionable relative the forward leg. A locking mechanism locks the first arm and the second arm at a selected angle relative to one another, whereupon securing the rearward and the forward leg to the ground or an affixed structure the rack is pivotal to position the solar panel. Upon positioning the rack to place the solar panel at a selected position, the locking mechanism is engaged to retain the solar panel at the selected position.

9 Claims, 4 Drawing Sheets

(56) References Cited

U.S. PATENT DOCUMENTS

| | | |
|---|---|---|
| 2009/0301466 A1 | 12/2009 | Humanes Asensio et al. |
| 2009/0320826 A1 | 12/2009 | Kufner |
| 2010/0071684 A1 | 3/2010 | Cowan et al. |
| 2010/0089390 A1 | 4/2010 | Miros et al. |
| 2010/0236183 A1 | 9/2010 | Cusson et al. |
| 2011/0005512 A1 | 1/2011 | Rueswick |
| 2011/0061644 A1 | 3/2011 | Pizzarello et al. |
| 2011/0108112 A1 | 5/2011 | Hong et al. |
| 2012/0111317 A1 | 5/2012 | Stout |
| 2012/0186632 A1 | 7/2012 | Reinhold et al. |

\* cited by examiner

SOLAR PANEL SUPPORT APPARATUS

CROSS-REFERENCE TO RELATED APPLICATION(S)

This application claims the benefit of U.S. Provisional Patent Application No. 61/560,738 filed on 16 Nov. 2011, which is hereby incorporated herein by reference.

BACKGROUND OF THE INVENTION

The present invention is generally directed at solar panel support structures. More specifically, the present invention includes a solar panel support apparatus securable to the ground or an affixed structure having a pivotal rack supporting at least one solar panel wherein the rack is selectively positionable to align the solar panel at a proper angle with the sun.

Over the past several decades, solar panels have become more and more of an acceptable means by which to produce electricity or heat water through use of the sun's rays. In recent years, better technology has allowed the use of solar panels to become even more widely accepted, especially in connection with small commercial businesses and residential use. Solar panels can assist in offsetting ever increasing energy consumption leading to lower energy costs, and a reduced carbon footprint.

In installing solar panels, there exist in the art both fixed mounting structures and tracking mounting structures. The latter are much more elaborate in design, requiring moving parts as well as a locomotive means and central processing unit to control its movement. For the vast majority of small businesses, and especially for home use, tracking mounting structures remain cost prohibitive.

Fixed mounting structures generally fall within two categories: ground mounted structures and building mounted structures. With regard to building mounted structures, the vase majority are roof mounted, but mounting structures on other parts of the building are known. When using fixed position structures, either ground or building mounted, solar panels must be installed at the proper angle to ensure the most effective capture of the sun's rays. Generally speaking, solar panels must be tilted from horizontal at an angle equal to the latitude where the solar panels are being installed. Further, this angle may change with the seasons, depending on the latitude of installation. As this angle is dependent upon the latitude at installation, a fixed mounting structure designed for, by way of example, the northern part of the United States may not be appropriate for the southern part thereof.

Currently, there are no solar panel support structures available which can be interchangeably mounted to the ground, a building or any other fixed structure. There are also no solar panel support structures that can be used universally, regardless the season of the year or latitude at which they are placed. There therefore exists a need in the art to provide a solar panel support structure that can be affixed to both the ground, buildings or any other affixed structure. There also exists a need in the art to provide a solar panel support structure which can be easily modified to position the solar panel at the proper angle at any latitude and at differing times of the year.

BRIEF SUMMARY OF INVENTION

A solar panel support apparatus in accordance with the present invention includes a rack assembly for supporting at least one solar panel pivotally attached to a base frame assembly. The base frame assembly includes two pairs of pivotally attached forward and rearward independently adjustable legs. A top portion of the rack assembly pivotally attaches to a top portion of each leg while a bottom portion of the rack assembly pivotally attaches to a rack support assembly. The rack support assembly includes two sets of pivotally connected forward and rearward arms which permit pivotal movement of the rack assembly relative to the forward leg. The forward arm of each rack support assembly set pivotally connects to a lower portion of the rack assembly while the rearward arm of each set pivotally connects to the respective forward leg. The rack support assembly further includes a locking mechanism to prevent movement of the forward arm relative to the rearward arm, and thus lock the rack assembly at a selected position relative to the forward leg. The locking mechanism includes opposing spaced-apart plates extending from the rearward arm for receiving the forward arm therebetween, or vice versa. A first pivoting pin disposed through a first set of corresponding apertures contained in the opposing spaced-apart plates and a first aperture contained in the forward arm pivotally connect the forward arm and the rearward arm. A second locking pin disposed through a second set of corresponding apertures contained in the opposing spaced-apart plates and a second aperture contained in the forward arm locks the forward arm to the rearward arm.

BRIEF DESCRIPTION OF THE DRAWINGS

The following figures are used herein in conjunction with the specification to assist in understanding the invention. The Figures are as follows.

DESCRIPTION OF THE INVENTION

Figure 1:
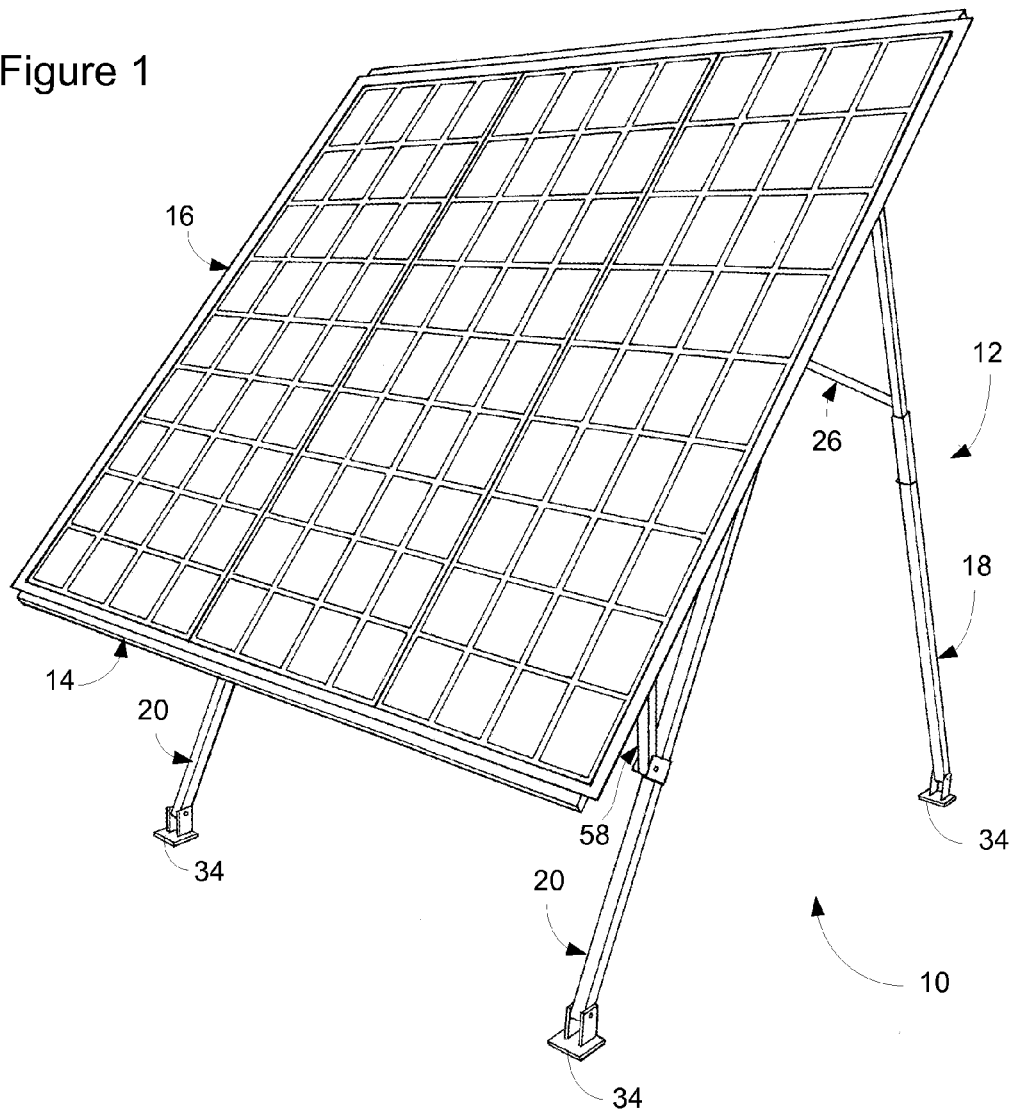
FIG. 1 is a perspective view of the solar panel support apparatus in accordance with the present invention having a solar panel array contained thereon.
Figure 2:
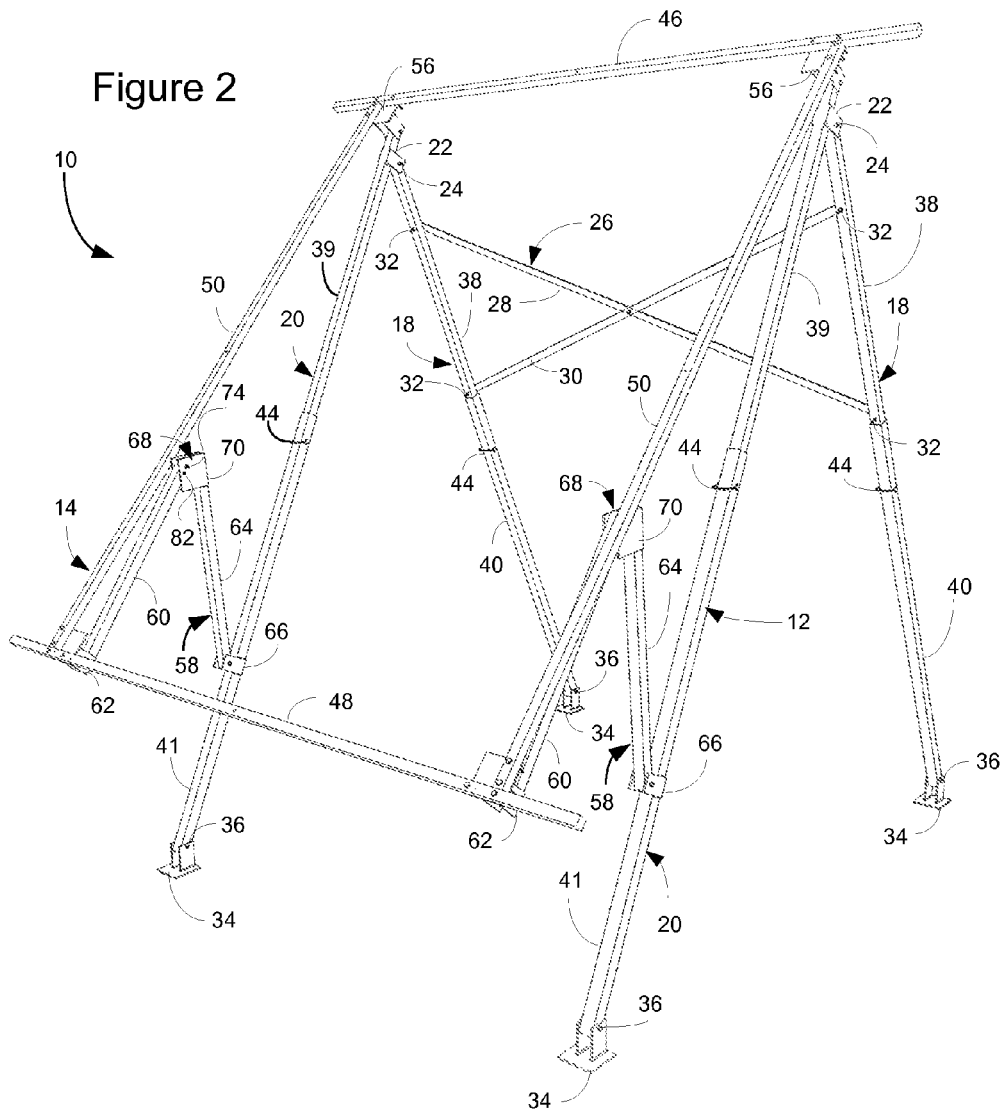
FIG. 2 is a perspective view of the solar panel support apparatus in accordance with the present invention.
Figure 3:
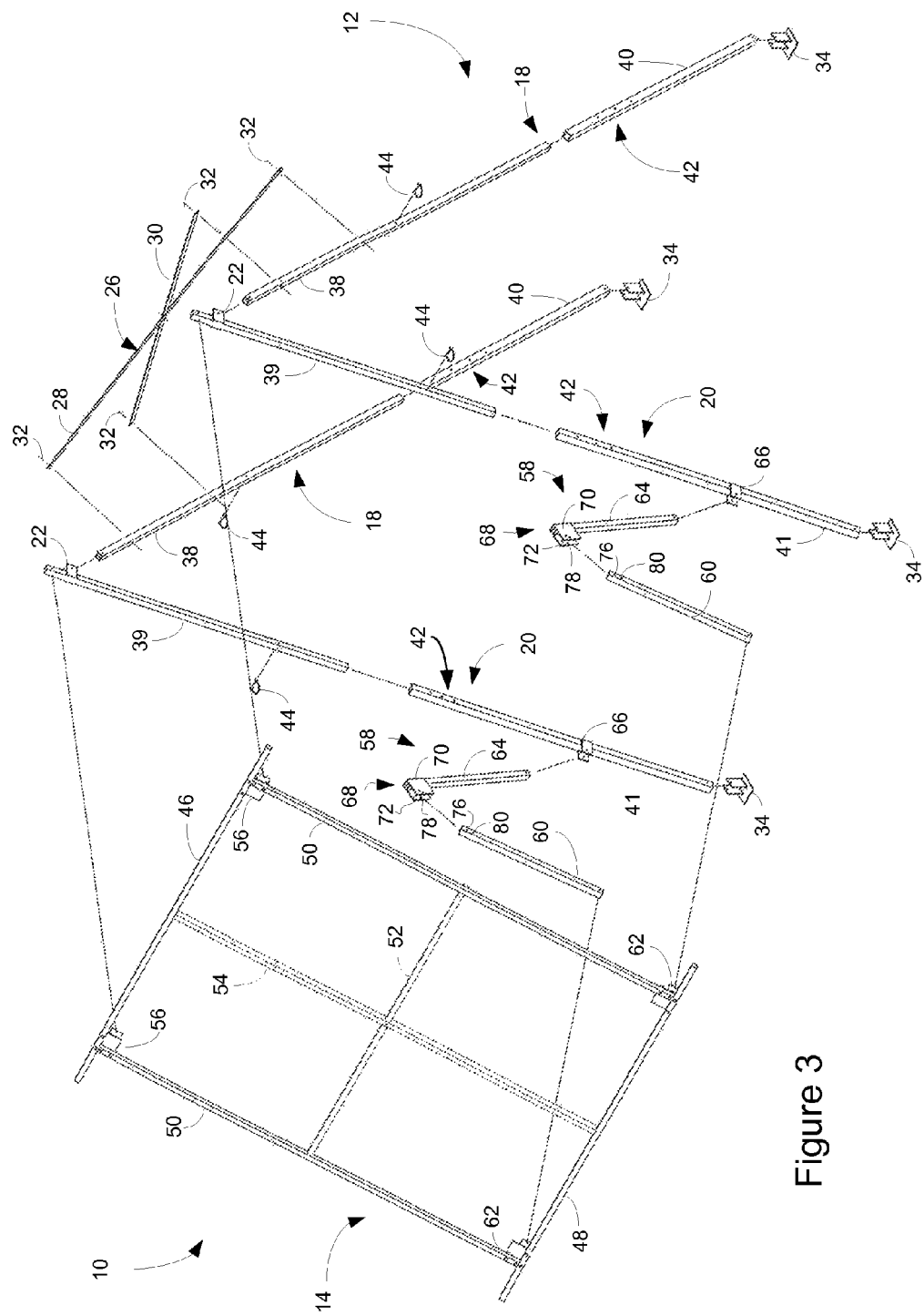
FIG. 3 is an exploded perspective view of the solar panel support apparatus in accordance with the present invention.
Figure 4:
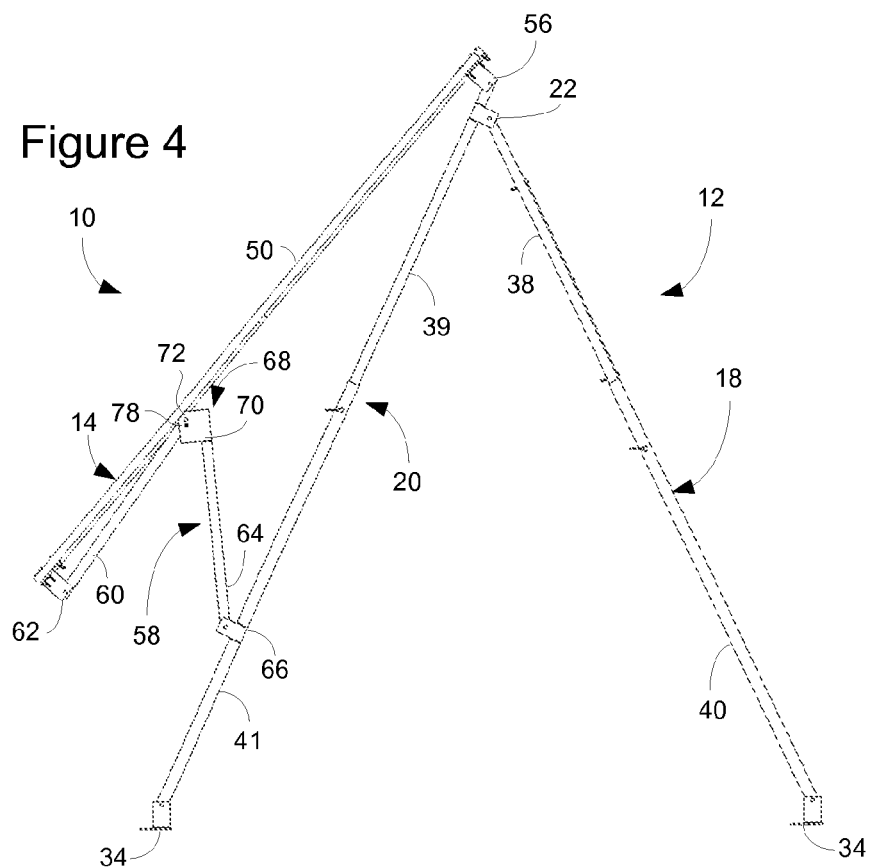
FIG. 4 is a side view of the solar panel support apparatus in accordance with the present invention.

A solar panel support apparatus in accordance with the present invention is generally indicated at 10 in FIG. 1. The apparatus 10 generally comprises a base frame assembly 12 supporting a pivotally attached rack frame 14 for supporting one or more solar panels or arrays 16. As best illustrated in FIGS. 2 through 4, the base frame assembly 12 includes a pair of spaced-apart rearward legs 18, each respectively pivotally attached to a pair of spaced-apart front legs 20 by means of a bracket 22 and accompanying pin or bolt 24. The rear legs 18 are supported by a brace 26 including a first segment 28 and a second segment 30 pivotally attached at central portions thereof and secured to the rear legs 18 by pins or bolts 32. Anchoring foot pads 34 and pins or bolts 36 are provided to pivotally secure each leg 18, 20 to the ground or any other suitable affixed structure, including a rooftop, post, footing or side of a building. To accommodate nearly every conceivable terrain or affixed structure, both the forward legs 20 and the rearward legs 18 are telescoping to independently increase or decrease their overall length. This is accomplished by means of a first top portion 38 for rear leg and 39 for forward leg slidably disposed within a second bottom portion 40 for rear leg and 41 for forward leg. Preferably, the top portion 38, 39 are provided with a variety of pre-drilled apertures 42 at varying locations for receiving a pin 44 therethrough to be mated with a corresponding aperture in the respective bottom portion 40, 41. It should be noted, however, that providing a plurality of apertures 42 in the bottom portion 40 to be mated with an aperture of the top portion 38 is well within the scope of the present invention. It should be further noted that it is well within the scope of the present invention that the end-user drill apertures to customize the positioning of the first top portion 38 relative to the second bottom portion 40 to adjust the height of each leg 18, 20. In this manner each forward leg 20 and rearward leg 18 can be independently adjusted to account for varying terrain or heights of a structure to which the base frame assembly 12 is securable.

The rack frame assembly 14 preferably includes a rectangular formation having opposing top and bottom members, 46 and 48, respectively attached to opposing side members 50 with use of brackets. The rack frame 14 is designed to be field adjusted by the end user to accommodate solar panels or arrays 16 of varying dimensions and from various manufactures. Optional horizontal and vertical cross members, 52 and 54, respectively, may be provided to secure solar panels or arrays 16 to the rack frame members 46, 48, 50. Brackets 56 permit pivotal attachment of a top portion of the rack frame assembly 14 to the forward legs 20, and in particular the top portions 38 of the forward legs 20. Opposing sides of a bottom portion of the rack frame assembly 14 each connect to respective forward legs 20 by means of a rack support assembly 58.

The rack support assembly 58 includes a forward arm 60 pivotally connected to the racking frame assembly 14 by means of a bracket 62, and a rearward arm 64 pivotally connected to the respective forward leg 20 by means of a bracket 66. Preferably, proximal end of forward arm 60 pivotally connects to the lower portion of the rack frame assembly 14, and proximal end of rearward arm 64 pivotally connects to the lower portion 40 of the forward leg 20. It should be noted though that it is well within the scope of the present invention to attach the forward arm 60 at differing locations along respective side members 50 of the racking frame assembly 14, as well as attach the rearward arm 64 at differing locations on the forward leg 20. The forward arm 60 and the rearward arm 64 pivotally connect to one another at distal ends where they can be locked to one another by means of a locking mechanism 68. The locking mechanism 68 includes opposing ears or plates 70 extending from the rearward arm 64 and spaced-apart from one another so as to receive the forward arm 60 therebetween. Alternatively, as one skilled in the art will recognize, it is well within the present invention to provide the ears 70 attached to the forward arm 60, with the rearward arm 64 disposing therebetween. Each ear 70 contains corresponding apertures 72 for receiving a pin 74 disposable through a cooperating aperture 76 positioned through the forward arm 60 to pivotally attach the forward arm 60 to the locking mechanism 68. When installed, the rack support assembly 58 preferably permits the rack frame assembly 14 to be positionable relative to the forward leg 20 between zero degrees, or parallel to the forward leg 20, and 90 degrees, or perpendicular to the forward leg 20, and an infinite number of positions therebetween. It should be noted, though, that it is well within the scope of the present invention to either modify the length of the forward and rearward arms, 60 and 64, respectively, or the positioning of the attachment of the forward and rearward arms, 60 and 64, respectively, to respective racking frame assembly 14 and forward leg 20 to modify the positioning angle of the racking frame assembly 14 relative to the forward leg 20 to go beyond 90 degrees.

Figure 5:
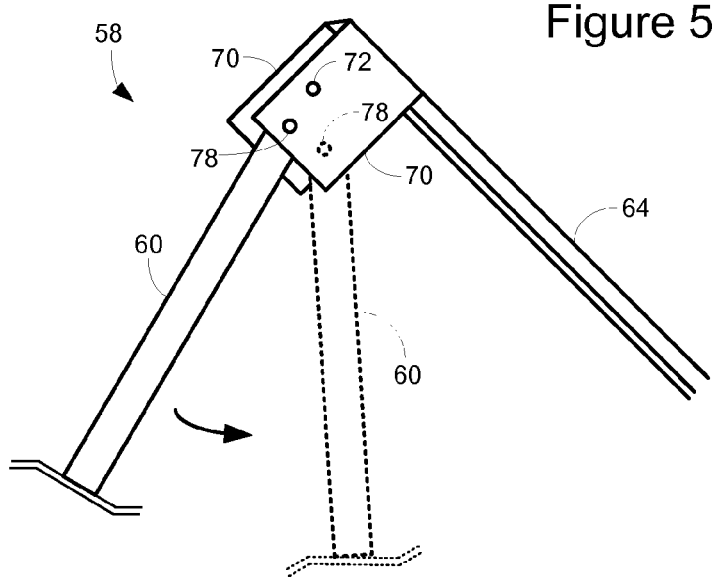
FIG. 5 is a partial perspective view of a rack support assembly in accordance with the present invention.

To lock the rack frame assembly 14 at a selected position, two methods are described. The first method accommodates an infinite number of positions of the rack frame assembly 14 within the arc range thereof. As is known in the art, the preferred angle of the solar panel or array 16, and thus the rack assembly 14, is first determined. Upon determining the selected position of the rack frame assembly 14, the user drills a second set of corresponding apertures 78 through each ear 70 of the locking mechanism 68 and a second aperture 80 through the forward arm 60 at the selected position of the rack frame assembly 14. A second pin 82 disposable through the second set of apertures 78 and the second aperture 80 prevents pivotal movement of the forward arm 60 about the rearward arm 64, and the two are locked in place. If later another positioning of the rack frame assembly 14 is desired, the user simply drills another set of cooperating apertures in the same manner as described to accommodate the updated selected position, as illustrated in FIG. 5. Alternatively, a second method includes providing one or more additional sets of cooperating apertures 78 through the ears 70 and for receiving the second pin 82 to lock the rack frame assembly 14 at a pre-selected position. The second method could accommodate a wide variety of preselected positions within the arc range of the rack frame assembly 14, and may allow for more than one positioning depending on specific needs of the user. Using either the first method or the second method, once the second locking pin 82 is properly positioned, movement of the forward arm 60 relative to the rearward arm 64 is not permitted, and the racking frame assembly 14 is locked into place at the selected position.

Alternatively, it is well within the scope of the present invention to remove the rear legs 18 and attach only the forward leg 20 a fixed structure, for example a vertical wall of a building. The racking frame 14 and rack support assembly 58 remain and operate as previously described.

It is recognized there are multiple variations beyond what are outlined in the detailed description to accomplish the objectives set forth by the current invention. Further alternative embodiments provide additional utility of the device for the convenience of the user. As such, although the present invention has been described with reference to preferred and alternative embodiments, workers skilled in the art will recognize that changes may be made in form and detail without departing from the spirit and scope of the invention.

The invention claimed is:

1. A solar panel support structure for selectively positioning a solar panel contained thereon, the structure comprising:
   a first leg securable to a mounting ground or an affixed structure;
   a second leg pivotally attached to the first leg, the second leg securable to the mounting ground or the affixed structure;
   a rack pivotally attachable to the first leg, the rack for supporting the solar panel, the rack including a top member, a bottom member positioned opposite the top member, and first and second spaced-apart side members disposed between the top member and the bottom member to form a rectangular rigid frame;
   a first arm having a proximal end pivotally attached to the first leg;
   a second arm having a proximal end pivotally attached to the rack, the first arm and the second arm pivotally connected to one another; and
   a securing device to lock the first arm and the second arm at a selected angle relative to one another, the securing device including first and second spaced-apart plates extending from a distal end of the first arm, each plate containing a first set of corresponding apertures for receiving a first in to pivotally secure the second arm to the first arm, and a second set of corresponding apertures for receiving a second in to fixedly secure the second arm to the first arm, wherein the rack is pivotal relative to the first leg to position the rack panel at a selected position, wherein the rack is retained at the selected position by the securing device.

2. The solar panel support structure of claim 1 wherein the first and second leg each comprise:
   a first lower segment;
   a second upper segment, the first lower segment and the second upper segment slidably engageable with each other; and
   a securing mechanism to secure the first lower segment and the second upper segment at a selected position in order to adjust the height of the support structure.

3. The solar panel support structure of claim 2 wherein a first end of the second upper segment of the first leg is pivotally attachable to a first end of the second upper segment of the second leg.

4. The solar panel support structure of claim 2 wherein a first end of each first lower segment are securable to the mounting ground or the affixed structure.

5. A solar panel support structure for selectively positioning a solar panel contained thereon, the structure comprising:
   a rearward leg securable to a mounting ground or an affixed structure;
   a forward leg securable to the mounting ground or the affixed structure, the forward leg pivotally attached to the rearward leg;
   a rack having an end pivotally attachable to the forward leg, the rack for supporting the solar panel, the rack including:
   a top member;
   a bottom member positioned opposite the top member; and
   first and second spaced-apart side members disposed between the top member and the bottom member to form a rectangular rigid frame;
   a first arm having a proximal end pivotally attached to the forward leg;
   a second arm having a proximal end pivotally attached to the rack, the first arm and the second arm pivotally connected to one another; and
   a locking mechanism to lock the first arm and the second arm at a selected angle relative to one another, the locking mechanism comprising:
   first and second spaced-apart apertures extending through a distal end of the second arm; and
   first and second spaced-apart plates extending from a distal end of the first arm for receiving the distal end of the second arm therebetween, each plate containing a first set of corresponding apertures for receiving a first in and a second set of corresponding apertures for receiving a second pin, wherein the first in disposes within the first set of corresponding apertures and the first aperture of the second arm to pivotally connect the first arm and the second arm, wherein the second in disposes within the second set of corresponding apertures and the second aperture of the second arm to prevent movement of the second arm relative to the first arm;
   whereby securing the rearward and the forward leg to the mounting ground or the affixed structure the rack is pivotal to position the solar panel, whereupon positioning the solar panel at a selected position the locking mechanism is engaged to lock the first arm and the second arm at the selected angle and retain the solar panel at the selected position.

6. The solar panel support structure of claim 5 wherein the forward and rearward leg each comprise:
   a first lower segment;
   a second upper segment, the first lower segment and the second upper segment slidably engageable with each other; and
   a securing mechanism to secure the first lower segment and the second upper segment at a selected position in order to adjust the height of the support structure.

7. The solar panel support structure of claim 6 wherein a first end of the second upper segment of the forward leg is pivotally attachable to a first end of the second upper segment of the rearward leg.

8. The solar support structure of claim 6 wherein a first end of each first lower segment are securable to the mounting ground or the affixed structure.

9. A solar panel support structure for selectively positioning a solar panel contained thereon, the structure comprising:
   first and second spaced-apart rearward legs each securable to a mounting ground or an affixed structure;
   first and second spaced-apart forward legs each securable to the mounting ground or the affixed structure, the first forward leg pivotally attached to the first rearward leg, the second forward leg pivotally attached to the second rearward leg;
   a rack frame assembly having an upper portion pivotally attachable to each forward leg, the rack for supporting the solar panel, the rack frame assembly including:
   a top member;
   a bottom member positioned opposite the top member; and
   first and second spaced-apart side members disposed between the top member and the bottom member to form a rectangular rigid frame;
   first and second rack support assemblies, each rack support assembly including a first arm having a proximal end pivotally attached to the respective forward leg and a second arm having a proximal end pivotally attached to the rack frame assembly, the first arm and the second arm pivotal to one another; and
   a locking mechanism to lock the first arm and the second arm at a selected angle relative to one another, the locking mechanism including:
   first and second spaced-apart apertures extending through a distal end of the second arm; and
   first and second spaced-apart plates extending from a distal end of the first arm for receiving the distal end of the second arm therebetween, each plate containing a first set of corresponding apertures for receiving a first in and a second set of corresponding apertures for receiving a second pin, wherein the first in disposes within the first set of corresponding apertures and the first aperture of the second arm to pivotally connect the first arm and the second arm, wherein the second in disposes within the second set of corresponding apertures and the second aperture of the second arm to prevent movement of the second arm relative to the first arm;
   whereby securing the rearward and the forward legs to the mounting ground or the affixed structure the rack is pivotal to position the solar panel at a selected position, whereupon positioning the solar panel at the selected position the locking mechanism is engaged to lock the first arm and the second arm of each rack support assembly at the selected angle and retain the solar panel at the selected position.

* * * * *